United States Patent [19]

Beley et al.

[11] Patent Number: 4,799,733
[45] Date of Patent: Jan. 24, 1989

[54] SEAT STRUCTURE HAVING A PIVOTABLE BACKREST AND IN PARTICULAR A FRONT SEAT STRUCTURE OF A MOTOR VEHICLE

[75] Inventors: Serce Beley, Seloncourt; Francois Fourrey, Montbeliard, both of France

[73] Assignee: Cycles Peugeot, France

[21] Appl. No.: 901,227

[22] Filed: Aug. 28, 1986

[30] Foreign Application Priority Data

Apr. 29, 1986 [FR] France ................................ 86 06193

[51] Int. Cl.⁴ .............................................. B60N 1/02
[52] U.S. Cl. ...................................... 297/379; 297/216
[58] Field of Search .......................... 297/379, 378, 216

[56] References Cited

U.S. PATENT DOCUMENTS

| | | | |
|---|---|---|---|
| 2,732,003 | 1/1956 | Williams | 297/379 |
| 3,550,949 | 12/1970 | Bonnaud | 297/379 X |
| 4,082,353 | 4/1978 | Hollowell | 297/379 |
| 4,103,964 | 8/1978 | Klingelhofer et al. | 297/379 X |
| 4,312,537 | 1/1982 | Lindenberg | 297/379 X |
| 4,390,207 | 6/1983 | Resag et al. | 297/379 |

*Primary Examiner*—Francis K. Zugel
*Attorney, Agent, or Firm*—Sughrue, Mion, Zinn, Macpeak & Seas

[57] ABSTRACT

The seat structure comprises a cushion (1) and a backrest (2) interconnected by a pin in two sections, one of these sections (4) being connected to the cushion and including a semi-bearing (8). The other section (6) is connected to the backrest and to a link (10) pivotally mounted at (12) on a support side wall (14). The pivot pin (12) is located in front of the connecting pin sections (4, 6) so that the backrest which pivots about this pin is swung over toward the front of the seat structure and completely clears the rear of the seat structure, for example for the passage of a rear passenger.

6 Claims, 2 Drawing Sheets

SEAT STRUCTURE HAVING A PIVOTABLE BACKREST AND IN PARTICULAR A FRONT SEAT STRUCTURE OF A MOTOR VEHICLE

The present invention relates to a seat structure more particularly adapted to be used as a front seat structure in a vehicle having two doors in which it is necessary to swing down the backrest of the front seat structure onto its seat cushion to permit access to the rear seats.

In front seat structures of this type, the backrest is usually mounted to pivot about a pivot pin which connects it to the seat cushion. This arrangement facilitates the construction and simplifies the locking, but unfortunately leaves only a relatively narrow space for the entry or exit of a rear passenger.

It has therefore been proposed to construct seat structures whose seat cushion also swings over toward the dashboard. The passage cleared is in this way considerably increased but the locking device must be distinctly stronger, i.e. more complex. Further, it is practically impossible to use in this case a seat structure which is adjustable in height and in inclination.

An object of the present invention is to overcome these drawbacks and to provide a seat structure having a pivotable backrest which permits the obtainment of a large clearance without shifting the seat cushion and, furthermore, may be associated with a device for raising the rear of the seat structure.

The invention therefore provides a seat structure having a pivotable backrest which comprises connection pin means between the backrest and the cushion made in two pin sections of which one is connected to the cushion and includes a semi-bearing for receiving the other pin section which is connected to both the backrest and to a link pivotally mounted on the cushion, and a hook for locking the section connected to the backrest in the semi-bearing connected to the cushion.

According to another feature of this invention, the link is pivotally mounted on a pin located in front of the connection pin between the cushion and the backrest.

The pivot pin of the link thus constitutes the pivot pin of the backrest on the cushion and consequently the pin about which the backrest is swung when access to the rear of the vehicle is desired.

The backrest is then completely moved away from the passage and this provides a maximum clearance.

Preferably, the connecting pin means extends, between the cushion and the backrest, through an opening in a fixed support side wall and is fixed to a pivotal member connected to a control for adjusting the seat structure in height, so that this adjustment produces a simultaneous and identical displacement of the locking hook.

The effectiveness of the locking hook is thus preserved irrespective of the position of the seat structure.

The following description of an embodiment, given by way of a non-limiting example and illustrated in the accompanying drawings, will bring out the advantages and features of the invention.

The frames of the seat structure, and in particular a motor vehicle seat structure, and the elements which assemble these frames or control their displacements are usually symmetrical with respect to the longitudinal median axis of the seat structure and only one of the sides of the seat structure has been represented and will be described, the other side being identical.

Figure 1:
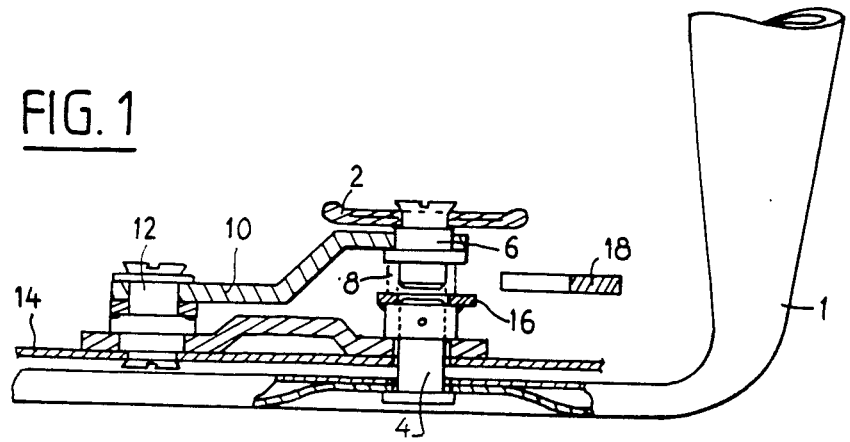
FIG. 1 is a sectional view taken on line 1—1 of FIG. 2 of the connection between the frames of the cushion and backrest of the seat structure of the invention.
Figure 4:
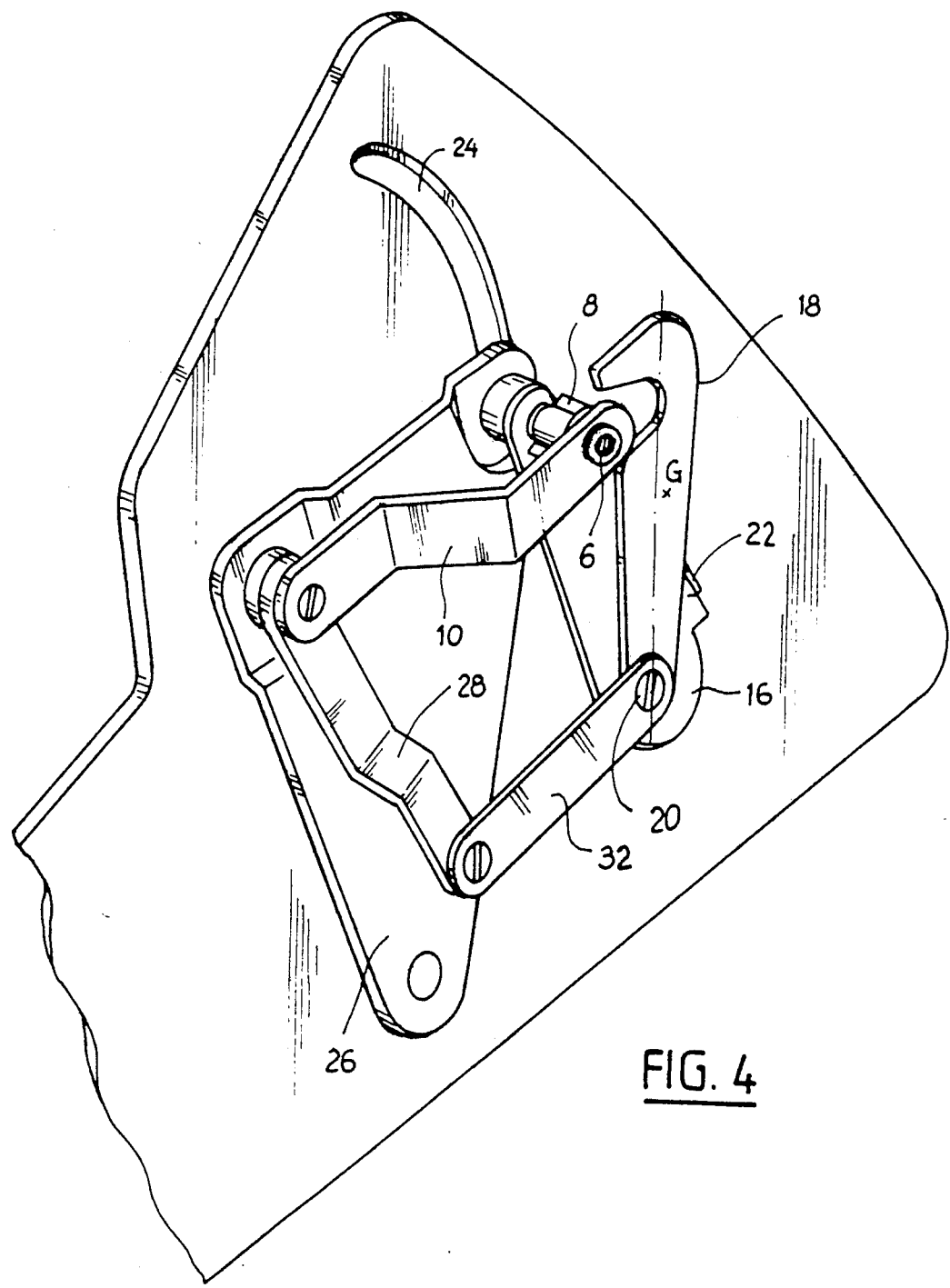
FIG. 4 is a perspective view of the connection between the cushion and the backrest shown in FIG. 2.

As shown in FIG. 1, the frame 1 of the cushion of the seat structure is connected to the frame 2 of the backrest by connecting pins means formed by two pin sections 4 and 6. The pin section 4 is fixed to the frame 1 of the cushion and carries a semi-bearing 8 i.e. a bearing cut in half along a diametrical plane as shown in FIG. 4 and constituting a semi-cylindrical bearing which receives the section pin 6 which is connected to the frame 2 of the backrest. The section 6 is moreover connected to a link 10 mounted to be pivotable about a pivot pin 12 on a support side wall 14 which ay be connected to the floor of the vehicle or movable in translation relative to the latter. The semi-bearing 8 is so disposed that the pin section 6 can travel through an arc of a circle about the pin 12 and can drive therewith the backrest 2 which can thus be swung relative to the cushion.

Preferably, and as shown, the pin 12 is located closer to the front of the seat structure than the connecting pin 4, 6, so that the backrest is not only swung over onto the cushion, but also shifted forwardly in the course of the pivoting of the link 10, which increases the clearance provided by this swinging over.

A link 16 secured to the pin section 4 in the vicinity of the semi-bearing 8 carries at its lower end a hook 18 which extends vertically upwardly toward the semi-bearing 8. The hook 18 is pivotally mounted at 20 on the link 16, but an abutment 22 prevents its rearward displacement, i.e. its movement away from the semi-bearing 8 beyond the chosen position of rest, i.e. the position in which its centre of gravity G is slightly offset toward the abutment 22 relative to the vertical through the centre of the pin 20. The hook 18 is thus in a slightly unstable position and consequently tends tc swing in the direction of the section 6 and the semi-bearing 8 upon the slightest thrust or upon the slightest inclination of its support. An unlocking device of any suitable type is of course provided for moving the hook 18 from the position in which it is fitted onto the section 6 and the semi-bearing 8 and bringing it to the illustrated substantially vertical position of rest.

Figure 2:
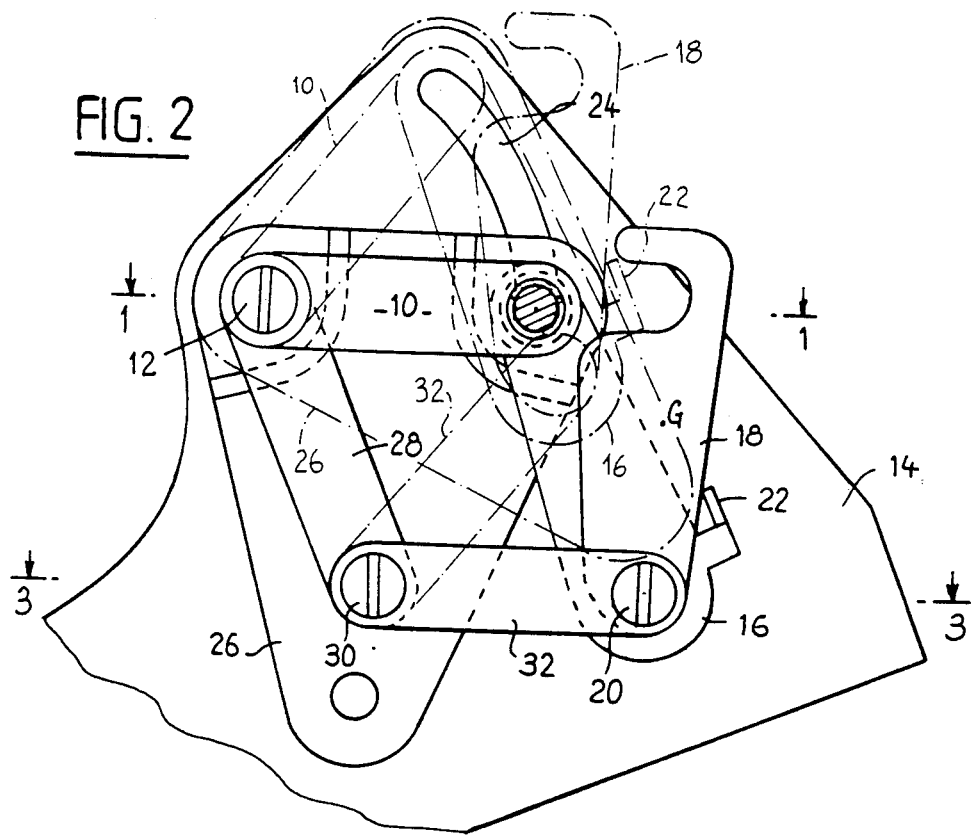
FIG. 2 is an elevational view of the connecting elements between the backrest and the cushion, the backrest and the cushion not being shown in order to simplify the Figure.
Figure 3:
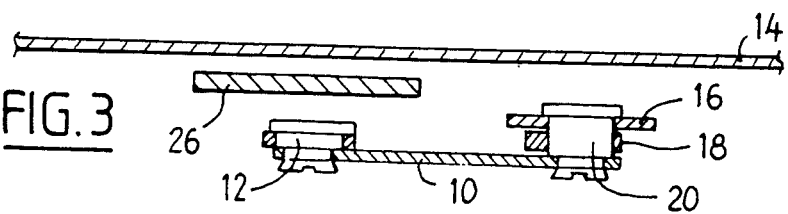
FIG. 3 is a sectional view on line 3—3 of FIG. 2.

Preferably, the support side wall 14 comprises a substantially vertical curved opening 24 and the pin section 6 is movable in this opening, i.e. can take up various positions in height, this pin section 6 carrying along therewith the frame of the cushion 1 and that of the backrest 2, which modifies the adjustment in height of the concerned seat structure. The pin section 4 is then connected to a plate or bracket 26 pivotally mounted on the pivot pin 12 of the link 10 and connected at its opposite end to a device for adjusting the seat structure in height, of any suitable type, which has not been shown in order to simplify the drawing (FIG. 2).

A link 28 is fixed to the pin 12 and is substantially parallel to the link 16 and carries at its end 30 a pivotal link 32 which is substantially parallel to the link 10 and pivotally mounted on the pivot pin 20 connecting the hook to the link 16. The assembly of the links 28, 32 and 16 thus forms with the plate 26, or more precisely the portion of the latter located between the pins 12 and 4, a deformable parallelogram structure which carries the hook 18 and connects it to the connecting pin 4, 6 of the backrest and the cushion.

When it is desired to adjust the height of the rear of the seat structure, i.e. when the bracket 26 pivots about the pin 12 and the connecting pin 4, 6 moves in the opening 24, the pin 20 effects a similar displacement about the pin 30 which is fixed and the link 16 moves while remaining parallel to itself and to the fixed link 28, so that the hook 18 preserves a constant position relative to the pin 4 and remains substantially vertical. Further, the slight offset of the centre of gravity G of the hook 18 relative to the vertical tends to cause the latter to pivot toward the abutment 22 so that this hook remains applied against this abutment and can only pivot toward the pin 4, 6, i.e. toward the locking position.

In all the positions of the seat structure, the hook 18 therefore remains ready to pivot toward the semi-bearing 8 and the pin section 6 and to lock the backrest to the cushion upon the least incident.

The backrest is swung in the same way irrespective of the adjustment in height and it can in no way modify this adjustment, since only the pin section 6 is raised and pivots with the link 10 about the pin 12. As the section 4 remains stationary, the user again finds the exact chosen position after the backrest has been put back into its position.

What is claimed is:

1. A seat structure for a vehicle or the like, comprising a pivotable backrest having a frame (2) and a seat cushion having a frame (1) and, disposed on each side of the seat structure, a support side wall (14), a pivot pin (12) mounted on the side wall;

means for adjustably supporting the cushion frame (1) on the side wall (14) and comprising a pivotal member (26) pivotally mounted on said pivot pin (12), and a first pin (4) having a longitudinal axis and mounted on the pivotal member (26) at a distance from said pivot pin (12) whereby the first pin (4) is movable by the pivotal member (26) upwardly and forwardly about said pivot pin (12) in a first arc of a circle centered on said pivot pin (12) whereby the first pin and the cushion frame (1) are adjustable in height by pivoting the pivotal member (26) about said pivot pin (12);

means for permitting the backrest frame (2) to move forwardly in translation when swinging the backrest frame forwardly relative to the cushion frame (1) and comprising a link (10) having a first end pivotally mounted on said pivot pin (12) and a second end, and a second pin (6) pivotally connecting the backrest frame (2) to said second end of the link, said second pin (6) being movable upwardly and forwardly along a second arc of a circle identical to said first arc of a circle about said pivot pin (12) independently of the cushion frame (1) from a first position located at the rear of the pivot pin (12) relative to the forward pivoting of the backrest frame (2), which the second pin (6) occupies in the non-swung over position of the backrest frame (2);

means for providing an abutment for the second pin in a position of axial alignment with the first pin in a normal non-swung over position of the backrest frame and comprising a substantially semi-cylindrical semi-bearing fixed to the first pin and axially extending beyond the first pin (4) for receiving the second pin (6) while allowing the second pin (6) to freely move out of the semi-bearing (8) when the second pin is moved along said second arc of a circle away from the first pin;

and means for preventing the second pin from leaving the semi-bearing when it is required to maintain the first pin and second pin in axial alignment with each other and comprising a hook (18) and means for pivotally mounting the hook on the pivotal member (26) in such manner that the hook is pivotable selectively to a hooking position for hooking onto and locking the second pin (6) and preventing it from leaving the semi-bearing (8), and a retracted unlocking position allowing the second pin (6) to leave the semi-bearing.

2. A seat structure according to claim 1, wherein in a normal position of use of the seat structure, the hook is in said unlocking postiion and extends upwpardly in a substantially vertical direction, said unlocking position being slightly unstable so that the hook is capable of pivoting on its own to said locking position as soon as the seat structure is subjected to a shock from the front of the seat structure, said means for pivotally mounting the hook on the pivotal member including means for maintaining the hook in a constant orientation the unlocking position of the hook.

3. A seat structure according to claim 1, wherein the locking hook is pivotally mounted in a lower part thereof below said first pin and an abutment is provided for engagement of the hook thereagainst for preventing a pivoting movement which would move the hook away from said semi-bearing and said first pin.

4. A seat structure according to claim 3, wherein the hook has a centre of gravity which is slightly offset from the vertical toward said abutment.

5. A seat structure according to claim 1, comprising an upwardly extending slot in the support side wall, said first pin extending into said slot.

6. A seat structure according to claim 5, wherein said means for pivotally mounting the hook on the pivotal meber (26) comprise a deformable articulated parallelogram structure for supporting the hook (18), the parallelogram structure having one side constituted by a portion of the pivotal member between said pivot pin (12) and said first pin (4) which constitutes two of the articulations of the parallelogram structure, said parallelogram structure comprising two parallel links (26,28) constituting two sides of the parallelogram structure and mounted on said pivot pin (12) and said first pin (4), and a third link constituting a third side of the parallelogram structure, and pivotally interconnecty said two parallel links, the hook being pivotally mounted on the parallelogram structure by an articulation of the parallelogram structure which is diagonally opposed to said pivot pin (12) in the parallelogram structure and the link mounted on the pivot pin (12) being in a fixed position relative to the support (14), abutment means (22) being provided on the link mounted on the first pin (4) and being cooperative with the hook for maintaining the hook in said retracted unlocking position irrespective of the position of the pivotal member 26.

* * * * *